(12) United States Patent
Callies et al.

(10) Patent No.: US 7,301,121 B2
(45) Date of Patent: Nov. 27, 2007

(54) METHOD AND DEVICE FOR LASER DRILLING IN A PROCESS GAS ATMOSPHERE

(75) Inventors: Gert Callies, Buehl (DE); Markus Willert, Koenigsbronn (DE); Kai Osswald, Babenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/532,851

(22) PCT Filed: Nov. 17, 2003

(86) PCT No.: PCT/DE03/03801

§ 371 (c)(1),
(2), (4) Date: Apr. 27, 2005

(87) PCT Pub. No.: WO2004/060603

PCT Pub. Date: Jul. 22, 2004

(65) Prior Publication Data

US 2006/0086700 A1     Apr. 27, 2006

(30) Foreign Application Priority Data

Jan. 7, 2003     (DE)     ................................ 103 00 134

(51) Int. Cl.
*B23K 26/00*     (2006.01)

(52) U.S. Cl. .......................... 219/121.61; 219/121.48; 219/121.51; 219/121.7; 219/121.84

(58) Field of Classification Search ........... 219/121.59, 219/121.4, 121.39, 121.45, 121.48, 121.51, 219/121.55, 121.7, 121.71, 121.84
See application file for complete search history.

(56) References Cited

U.S. PATENT DOCUMENTS

| | | | |
|---|---|---|---|
| 5,744,780 A | 4/1998 | Chang et al. | |
| 6,070,813 A | 6/2000 | Durheim | |
| 6,630,645 B2 * | 10/2003 | Richter et al. | ......... 219/121.71 |

FOREIGN PATENT DOCUMENTS

| | | |
|---|---|---|
| DE | 199 08 630 | 8/2000 |
| DE | 199 055 71 | 11/2000 |
| DE | 100 54 853 | 8/2002 |
| EP | 0 299 143 | 1/1989 |
| GB | 1 585 609 | 3/1981 |
| JP | 2002 050849 | 6/2002 |

* cited by examiner

*Primary Examiner*—Mark Paschall
(74) *Attorney, Agent, or Firm*—Kenyon & Kenyon LLP

(57) ABSTRACT

A method and device for laser drilling in which the geometric form of the drill-hole wall is influenced by reciprocal action between a laser beam and a supplied process gas, which thereby is ionized to plasma. Furthermore, the outlet opening of the drill hole is influenced by a suitable arrangement of a backing.

6 Claims, 3 Drawing Sheets

METHOD AND DEVICE FOR LASER DRILLING IN A PROCESS GAS ATMOSPHERE

BACKGROUND INFORMATION

Precision micro-holes in nozzles of fuel-injection systems are usually introduced with the aid of erosion methods. Using this technology, it is currently possible to produce minimal diameters of approximately 120 μm in large-scale production. Furthermore, laser drilling also allows the production of precision holes having diameters of less than 120 μm, but this has not yet been introduced as large-scale method.

In the fuel-injection field, there is increasing demand for conical holes to the effect that a fuel-outlet orifice have a smaller diameter than a fuel-intake orifice. Such precision micro-holes are already utilized in systems for diesel fuels (direct injection) or for gasoline (manifold and direct injection).

German Patent No. DE 199 055 71 describes a laser-drilling method in which a laser beam executes a wobbling motion relative to a workpiece. This has the effect that a cone-shaped shell surface is traversed inside the workpiece. The polarization plane of the laser beam is rotated in synchrony with the wobbling motion.

German Patent Application No. DE 100 548 53 describes a method for introducing a micro-hole in a workpiece by means of a laser beam. In this case, the focus of the laser beam is moved continually along a circular path which is concentric with respect to the hole axis, the laser beam being composed of a succession of short laser pulses.

In all current drilling methods, the produced bore must be subjected to follow-up treatment by hydro-erosive (HE) rounding. In fuel injection systems, for instance, this is done primarily to round the edge of the fuel intake (in addition to improving the surface of the bore wall and reducing the variance among the hydraulic flow rates of the individual bore holes of a nozzle). This results in a considerable reduction of the flow resistance at this point and also reduces undesired cavitation manifestations.

An additional considerable improvement in this direction is achieved by the combination of conicalness and distinct HE-rounding.

SUMMARY OF THE INVENTION

The present invention is intended to selectively influence the profile of the outlet of the bore hole (fuel intake) during the drilling operation using short-pulse (ns) or ultra-short pulse (ps/fs) lasers. In particular, a simple and low-cost production of various symmetrical and asymmetrical outlet profiles is provided, such profiles including, for instance, widened regions and bulges.

In the laser drilling method provided according to the present invention, a region of a component is acted upon by a laser beam and a hole is produced within this region. This action or drilling is implemented under an adjustable process-gas atmosphere. Due to reciprocal action between the utilized laser beam and the selected process gas within the area or hole acted upon by the laser beam, plasma is generated by ionization of the process gas. According to the present invention, it is additionally provided that a backing be arranged at an outlet orifice of the hole produced by the laser beam.

The process gas or gas mixture utilized according to the present invention primarily serves to increase the processing quality and to optimize the processing time, in particular to shorten the processing time. By creating special process-gas atmospheres, the laser beam-material interaction is indirectly influenced in the impinged-upon region or hole, and thus the processing process as well. The type of process-gas atmosphere determines the properties of the plasmas that forms according to the present invention during the reciprocal action of the utilized laser radiation with the material or matter to be processed, the plasma formation being aided by material vapor. A solid-state laser (Nd:YAG), for instance, is used as a laser. Different process gases in each case produce plasmas that may differ in their temperature and expansion, for instance.

To be mentioned as a particular advantage of the method according to the present invention is the possibility of considerably reducing the process time of the HE-rounding to produce rounded forms, or of making the HE rounding entirely unnecessary to begin with. Furthermore, using the method according to the present invention, the fuel intakes may be designed in a way that is not possible with HE-rounding. According to the present invention, it is possible, in particular, to introduce asymmetrical rounded forms or symmetrical or asymmetrical bulges right behind the fuel intake. Rounded forms have the advantage of an improved intake response, whereas bulges may be used to prevent, or also selectively generate, turbulence that may occur at the fuel intake.

Particularly important for the selective design of the outlet is the plasma state shortly before and during the reemergence of the laser beam from the material. Depending on the selected parameters such as gas composition, gas pressure and/or gas flow direction, rounded forms, bulges and/or sharp discharge edges may form; these phenomena may occur across the entire bore-hole outlet in an even, rotationally symmetrical manner, or they may come about on one side only.

Rear-space protection materials, so-called backings, are used to prevent the free propagation of the laser beam after it reemerges from the material or matter. This may normally be utilized to prevent damage to another workpiece or component, or areas of the same workpiece. Furthermore, such backings are able to maintain the state of a closed bore hole for a certain period of time and thus contribute to the production of a desired discharge orifice or a bore hole outlet.

Depending on the application, backings are made from various materials such as polymers, metals or ceramic materials.

A backing is able to influence the formation of a bore hole outlet by reflecting the arriving laser radiation back in the material direction or in that it influences the plasma, ionized from the process gas, in its propagation, thereby leading to additional material removal. An additional effect may come from a plasma that is possibly produced by erosion of the backing.

For practical purposes, the method uses as process gas an inert gas such as nitrogen, in particular with the addition of noble gases such as helium, argon and the like. The use of such a process gas has the advantage that an area to be acted upon is rendered inert, thereby preventing oxidation of this region. Moreover, such a composition of the process gas ensures adequate surface qualities of the bore hole wall and melt-film thicknesses.

Furthermore, the process gas is preferably pressurized, the pressure being preferably set to below approximately 1.5 bar. This promotes the formation of hollow forms in the produced holes. It is also possible to select higher pressures, which allows hollow forms to be suppressed. Overall it may be said that the pressures utilized according to the present invention result in hollow forms in the vicinity of the edge region of the workpiece to be processed. The higher the pressure utilized, the greater the shift of a hollow form toward the interior of the workpiece.

Furthermore, it may preferably be provided to set the impingement direction of the process gas by tilting relative to the direction of the laser beam, the tilting angle possibly amounting to between 0° und 15°. Suitable selection of a tilting angle ensures that hole shapes, in particular hollow forms or widened forms, with various degrees of asymmetry are able to be formed.

Due to the plasmas produced in implementing the method according to the present invention, calculated pressures on the order of a few 100 bar and flow velocities of several 10 km/s may occur in the acted-upon region or hole. Due to an accelerated removal of a melt resulting therefrom, among others, an active contribution is rendered towards higher material removal.

Apart from the prevailing introduction conditions of the process gas (composition, pressure, direction), the ionization of the process gas may also be influenced by, in particular, the properties of the laser beam such as wavelength and output.

A backing used in this context may exhibit thermal or optical characteristics that influence the shape or the design of the outlet orifice. Suitable metallic materials, especially copper, are provided here, in particular. These material properties are especially important for the degree of the widening of the outlet orifice. For example, when using laser wavelengths of 1064 μm and a backing of copper which is arranged at a suitable distance from the outlet orifice, relatively large widened forms are produced, whereas relatively small widened forms come about with a backing of steel. Furthermore, the geometry of the backing may influence the form or design of the outlet orifice. In the present invention, the use of copper as backing material is particularly preferred. It should be mentioned that copper is generally not favored in engine building since sulfide may form in the case of copper deposits in the engine area due to reciprocal actions with sulfide that is present in the fuel, such sulfide formation having a negative influence on the service life of the engine. However, these disadvantages are clearly outweighed by the properties of copper that are able to be utilized within the framework of the present invention in connection with the production of specially formed holes in workpieces.

Furthermore, it may preferably be provided to arrange the backing at a distance from the outlet opening that influences the shape of the outlet orifice. Such a distance is preferably selected between 20 μm to 200 μm.

By appropriate selection of such a distance, the geometry of the widened form of the borehole exit may be influenced in a simple manner.

The backing may be arranged at a specified angle by tilting relative to the outlet orifice. Various degrees of tilting produce widened areas of the outlet hole of the borehole whose asymmetries vary accordingly. The angles preferably used for this purpose are in the range of 0° to 20°.

Especially by suitable selection of the form of the backing or the arrangement of the backing relative to the outlet orifice, symmetrical or asymmetrical rounded forms are able to be introduced in a region of the outlet orifice of a hole in an uncomplicated manner, yielding the advantage of no longer requiring retroactive HE rounding at all or requiring such rounding only to a limited degree.

The device according to the present invention by which the method of the present invention, in particular, is able to be implemented, is distinguished by the provision of a laser beam, a retaining device for a component to be processed and means for adjusting a process-gas atmosphere.

At least one gas nozzle may preferably be provided as means for adjusting the process-gas atmosphere. In this way, flowing process gas of a suitable composition may be aimed at the region of a workpiece to be acted upon in a manner that is easy to control or regulate and may be carried out at a suitable pressure and an appropriate angle. A suitable composition of the process gas may be provided by a gas mixer.

According to the present invention, the device may additionally be refined in such a way that a backing is able to be positioned at an outlet orifice produced in the component by the action of the laser beam.

DETAILED DESCRIPTION

Figure 1:
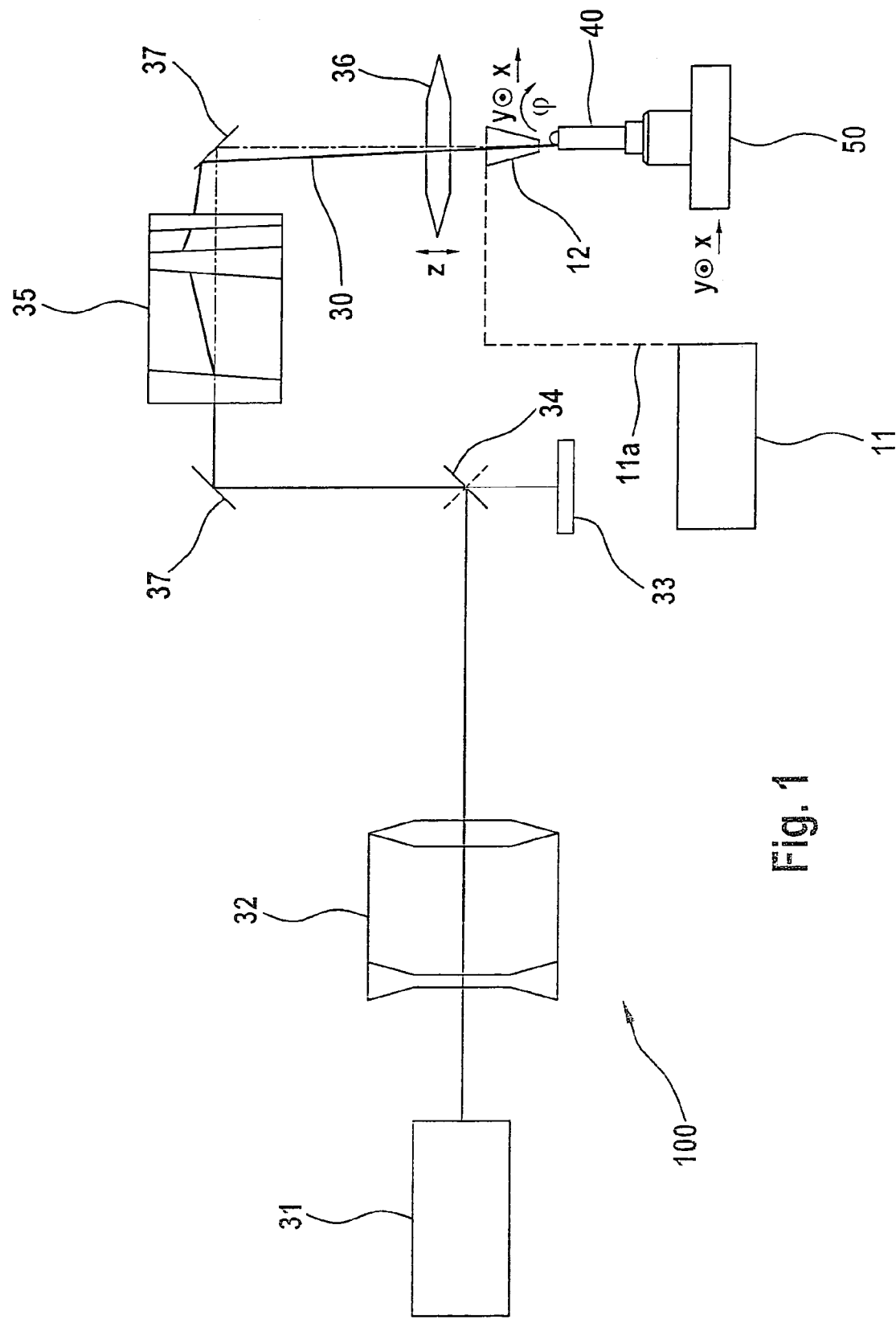
FIG. 1 shows a schematic representation of a preferred specific embodiment of the device according to the present invention for implementing the laser-drilling method according to the present invention.

The illustrated specific embodiment of the device according to the present invention is designated as a whole by 100. A laser beam 30 generated by a laser 31 first traverses an expanding lens 32. Laser beam 30 is partially reflected or switched at a shutter 34, scattered or excess residual radiation being absorbed by a radiation sink 33. The direction of laser beam 30 inside its optical path is deflected by one or a plurality of mirrors 37. A trepanning lens 35 is also disposed inside the optical path, and the device for focusing the laser beam also has a focusing lens 36. In addition, the optical path of laser beam 30 runs through a gas nozzle 12 and impinges upon a workpiece 40 to be processed.

The process gas required to implement the method according to the present invention is provided by a gas mixer 11 and forwarded to a gas nozzle 12 via a line 11a. The process gas is blown directly onto workpiece 40 with the aid of a gas nozzle 12.

Workpiece 40 is mounted in a handling device 50. Using suitable measures, this handling device 50 is moveable in all three spatial directions x, y and z, so that a suitable position of workpiece 40 for implementing the method is able to be adjusted. Positioning the focusing lens 36 along axis z allows laser beam 30 to be varied in its focusing position. It is likewise possible to position gas nozzle 12 with respect to the direction of the optical path of laser beam 30 running through gas nozzle 12, or to position it relative to workpiece 40. In the process, a movement along direction x or y takes place. A rotation of gas nozzle 12 is also able to be realized by means of a suitable mechanism, such rotatability being symbolized by φ in FIG. 1.

The method for laser drilling according to the present invention is able to be realized in a very simple manner when using this specific embodiment of device 100 according to the present invention. Laser beam 30, its optical path having traversed gas nozzle 12, impinges upon workpiece 40 within a region to be acted upon. A selected or adjusted process gas, provided by gas mixer 11, flows under pressure from an adjustable direction out of nozzle 12 onto the region of workpiece 40 to be acted upon. This, in particular, promotes the ionization of process gas to plasma by reciprocal action between process gas and laser beam 30 within the acted-upon region.

Figure 2:
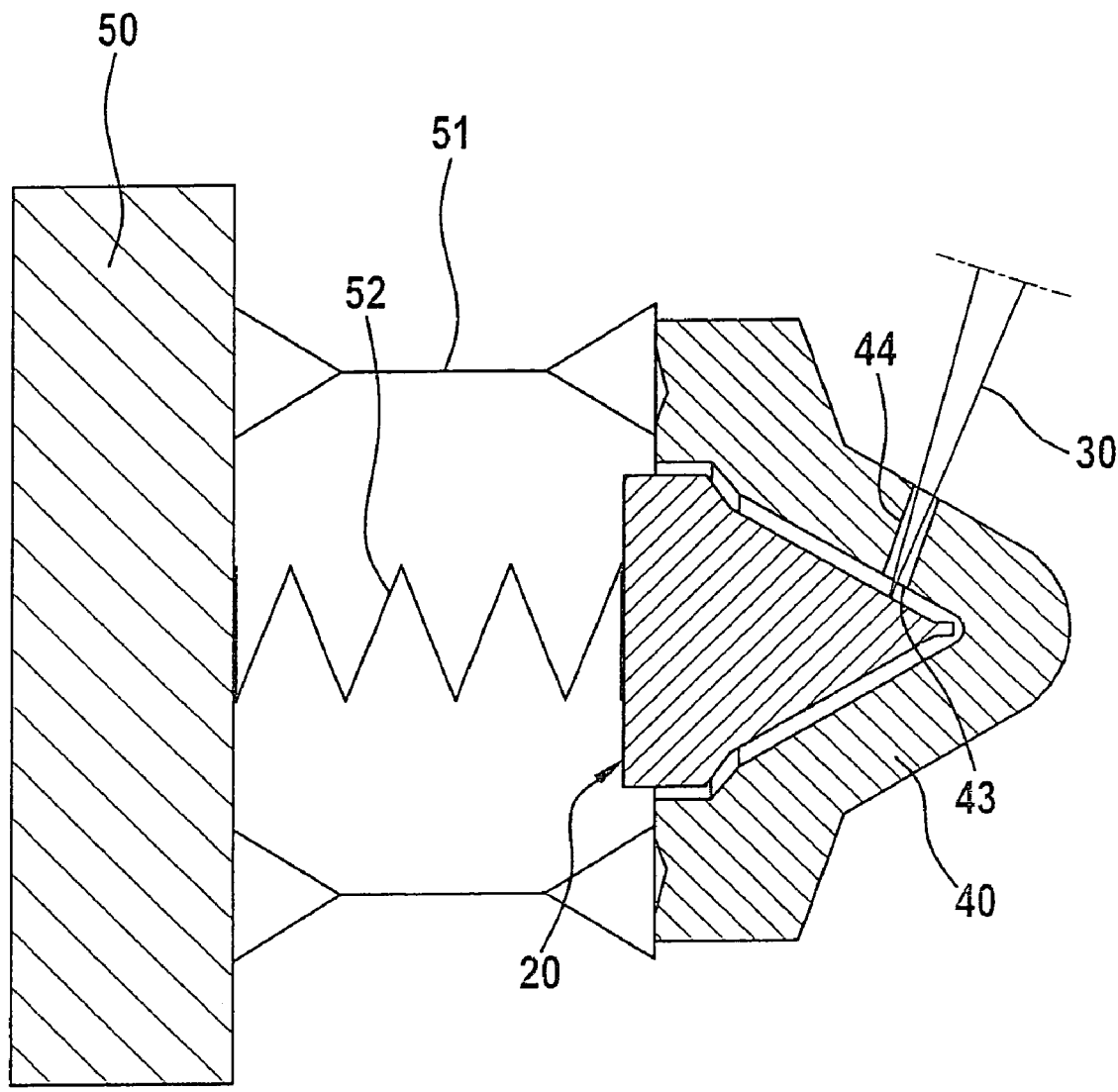
FIG. 2 shows a detail of the device according to FIG. 1, in an enlarged representation.

FIG. 2 shows a cut-away portion of FIG. 1. Using a mounting support 51 workpiece 40 is able to be firmly positioned with respect to handling device 50, a suitable position of workpiece 40 relative to handling device 50 being adjustable by means of movement via mounting support 51. In the same way, a backing 20 is able to be firmly positioned relative to handling device 50 via a holding device 52, a suitable position of backing 20 relative to handling device 50 being adjustable via holding device 52 by movement. By controlling mounting support 51 or 52, backing 20 and workpiece 40 may be spatially positioned as desired with respect to each other; this may be done both before and also during the described method.

A hole 44 to be produced in workpiece 40 by means of the laser-drilling method is created in the location of workpiece 40 where laser beam 30 impinges upon workpiece 40 or acts upon it, the laser beam exiting at an outlet opening 43 of hole 44 on the side of workpiece 40 that faces backing 20. The process gas, which is blown by a gas nozzle (not shown) onto workpiece 40 at a suitable angle and from an appropriate distance, is ionized to plasma by reciprocal action with laser beam 30 in the region of hole 44 or a region of outlet opening 43.

This produces selective geometrical forms in the region of hole 44 or outlet opening 43 as will now be illustrated by way of example with the aid of the following figures.

FIGS. 3a through 3e show detailed views of holes or bore holes 44 within workpiece 40 in a sectional view in parallel with a bore hole center axis 46 of hole 44. A laser beam 30 (not shown) had been aimed at workpiece 40 from the left, in parallel with bore-hole center axis 46; laser beam 30 penetrated workpiece 40 in the impingement region, the entrance location not being shown in FIGS. 3a to 3e. The individual outlet openings 43 of holes 44 are visible in FIGS. 3a to 3e.

Figure 3A:
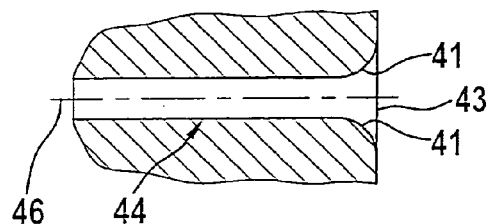
FIGS. 3a through FIG. 3e show schematic representations of boreholes produced according to the present invention, in a lateral sectional view.

In FIG. 3a, a region of outlet opening 43 of bore hole 44 has a symmetrical widened form 41 or rounded form, which is the result of a preferably symmetrical arrangement of a backing (not shown) with respect to bore-hole center axis 46 within a region behind—in the illustration of FIGS. 3a to 3e, to the right—of outlet opening 43. The degree of this widened form 41 or rounding is able to be influenced by appropriate spacing of the backing relative to outlet opening 43.

Figure 3B:
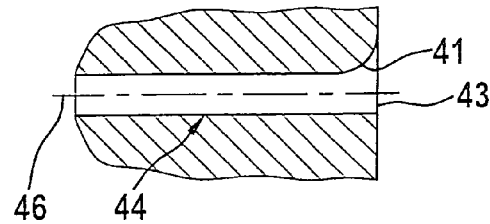

Widened form 41 of an area of outlet opening 43 of bore hole 44 shown in FIG. 3b has an asymmetrical design or is rounded on one side only. In this example the method according to the present invention was implemented in such a way that the backing was arranged in a region behind outlet opening 43 and tilted at a suitable angle with respect to bore hole center axis 46.

Figure 3C:
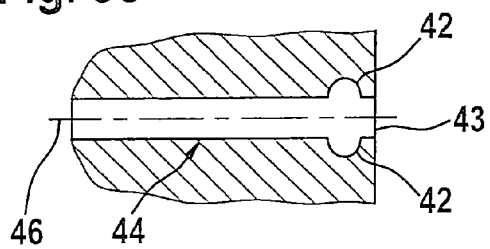

Bore hole 44 from FIG. 3c has symmetrical or bilateral bulges 42 in a region of outlet opening 43 of hole 44. Such a bulge 42 is realizable by the described reciprocal action between laser beam and formed plasma, for example.

Figure 3D:
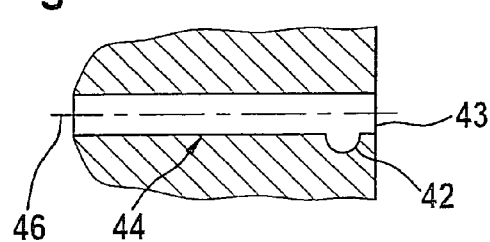

Bore hole 44 shown in FIG. 3d has an asymmetrical bulge 42. Such an asymmetrical form of bulge 42 is facilitated by tilting of a nozzle that introduces the process gas, such tilting being implemented at a suitable angle relative to bore hole center axis 46 or the laser beam.

Figure 3E:
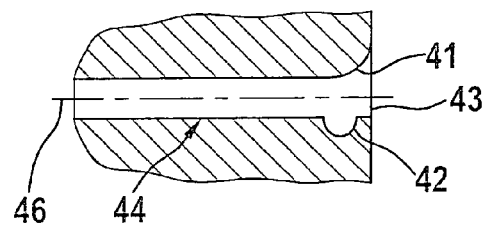

Bore hole 44 in FIG. 3e is designed such that it has a combination of widened form 41 and bulge 42 in a region of outlet opening 43. Such a design may be realized by combining the afore-described measures (tilting of the backing and impingement of the process gas at an angle).

Figure 4A:
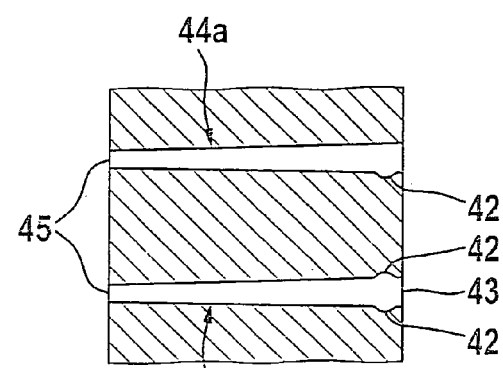
FIGS. 4a through 4c show schematic representations of boreholes produced according to the present invention, in a lateral sectional view or in a plan view on the basis of electron-microscopic photographs.
Figure 4B:
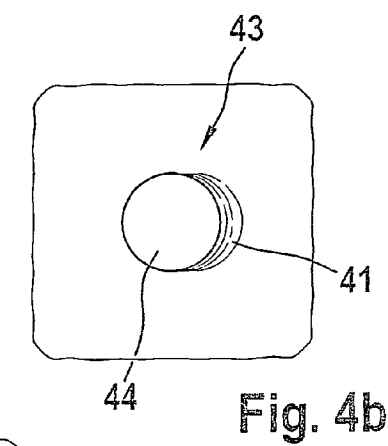
Figure 4C:
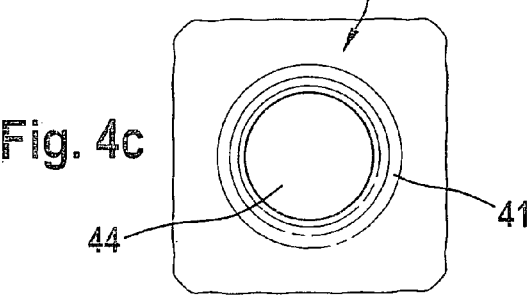

Additional specific embodiments of holes 44 or outlet openings 43 within workpiece 40 produced by the method according to the present invention are shown in FIGS. 4a to 4c in longitudinal section or in a plan view.

FIG. 4a shows two different forms of bulges 42 in longitudinal section.

Furthermore, intake openings 45 are shown, which are produced by impingement of the workpiece by a laser beam arriving from the left, and have a smaller diameter than outlet openings 43 on the right. In hole 44a shown above, bulge 42 is asymmetrical, analogously to FIG. 3d, whereas two symmetrical bulges 42 are shown in lower hole 44b, analogously to FIG. 3c.

Outlet opening 43 illustrated in FIG. 4b has an asymmetrical widened form 41 or rounding. This is realized by appropriate measures as they have been described with reference to FIG. 3b. FIG. 4c shows an outlet opening 43 from the same perspective as FIG. 4b, this opening having a symmetrical widened form 41 or rounding, which is realized by analogous implementation of the method according to the present invention as it was described with reference to FIG. 3a.

What is claimed is:

1. A method for laser drilling comprising:
   acting upon a region of a workpiece by a laser beam, so that a hole is produced in the region;
   implementing the method under an adjustable process-gas atmosphere in such a way that, due to a reciprocal action between the laser beam and a process gas, plasma forms in at least one of the region and the hole acted upon by the laser beam;
   arranging a backing at an outlet opening of the hole produced by the laser beam, the backing arranged with tilting at a specific angle with respect to at least one of the outlet opening and the workpiece, the angle influencing a form of the outlet opening; and
   adjusting an impingement direction of the process gas by tilting relative to a direction of the laser beam, a tilting angle being up to 15°.

2. The method according to claim 1, wherein an inert gas, with an addition of noble gases, is used as the process gas.

3. The method according to claim 2, wherein the inert gas includes nitrogen, and the noble gases include at least one of helium and argon.

4. The method according to claim 1, further comprising pressurizing the process gas at a pressure of maximally 1.5 bar.

5. The method according to claim 1, wherein a material used for the backing has at least one of thermal and optical properties that influence the form of the outlet opening, the material including at least one of a metallic material and a copper-containing material.

6. The method according to claim 1, wherein the backing is arranged at a distance from at least one of the outlet opening and the workpiece that influences the form of the outlet opening, the distance being between 20 µm and 200 µm.

* * * * *